Feb. 9, 1971  H. KOMENDOWSKI  3,561,058
RIM SHAPING AND TRIMMING APPARATUS FOR PLASTIC
CONTAINERS AND THE LIKE
Filed April 4, 1968  5 Sheets-Sheet 2

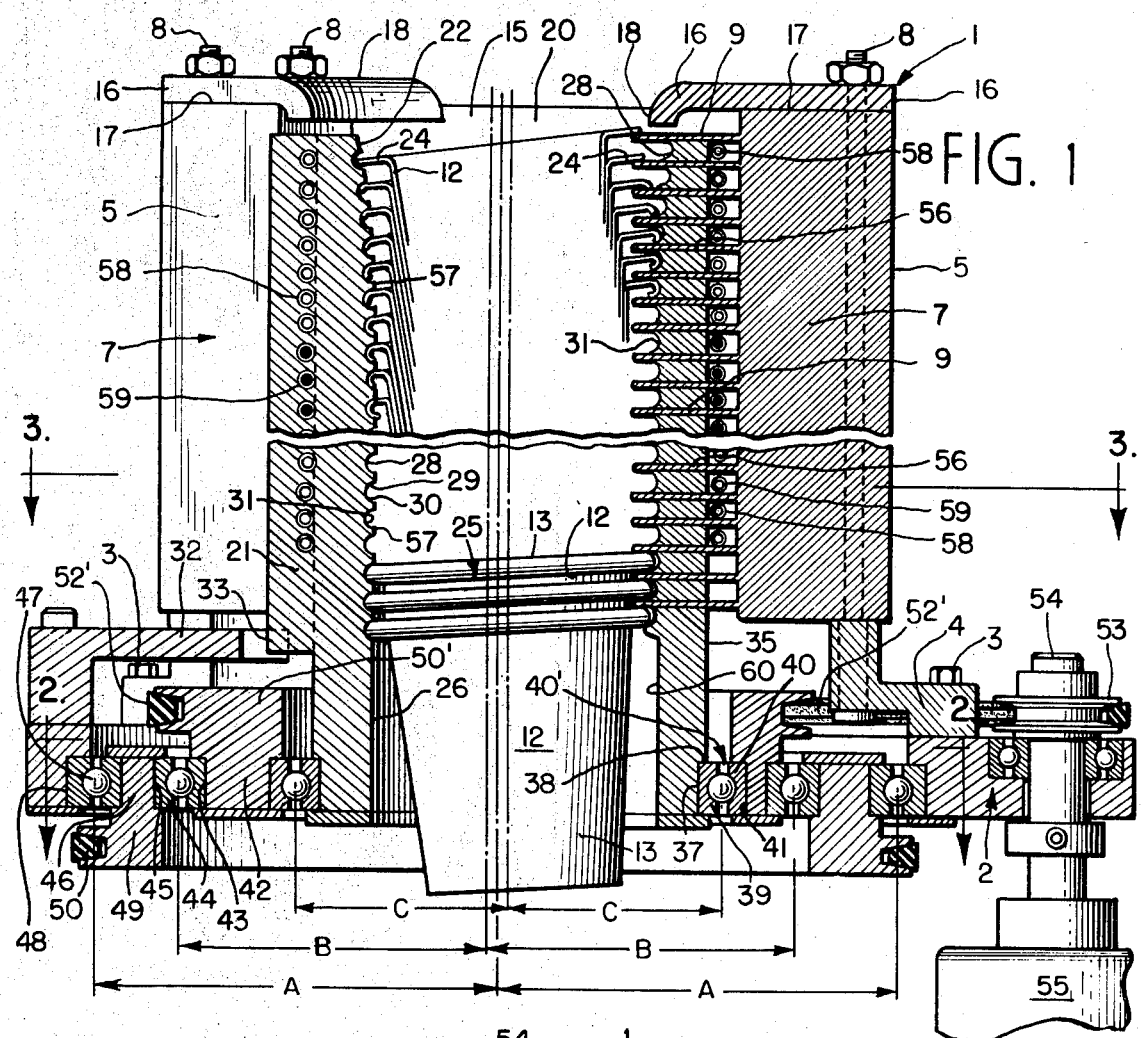
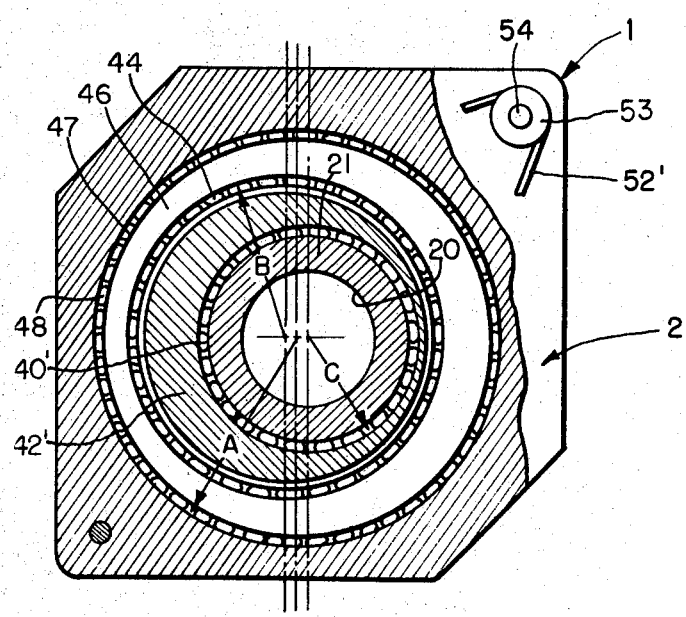

INVENTOR.
Henry Komendowski
BY
John J. Komalik
Attorney

FIG.5

INVENTOR.
Henry Komendowski
BY John J. Kowalik
Attorney

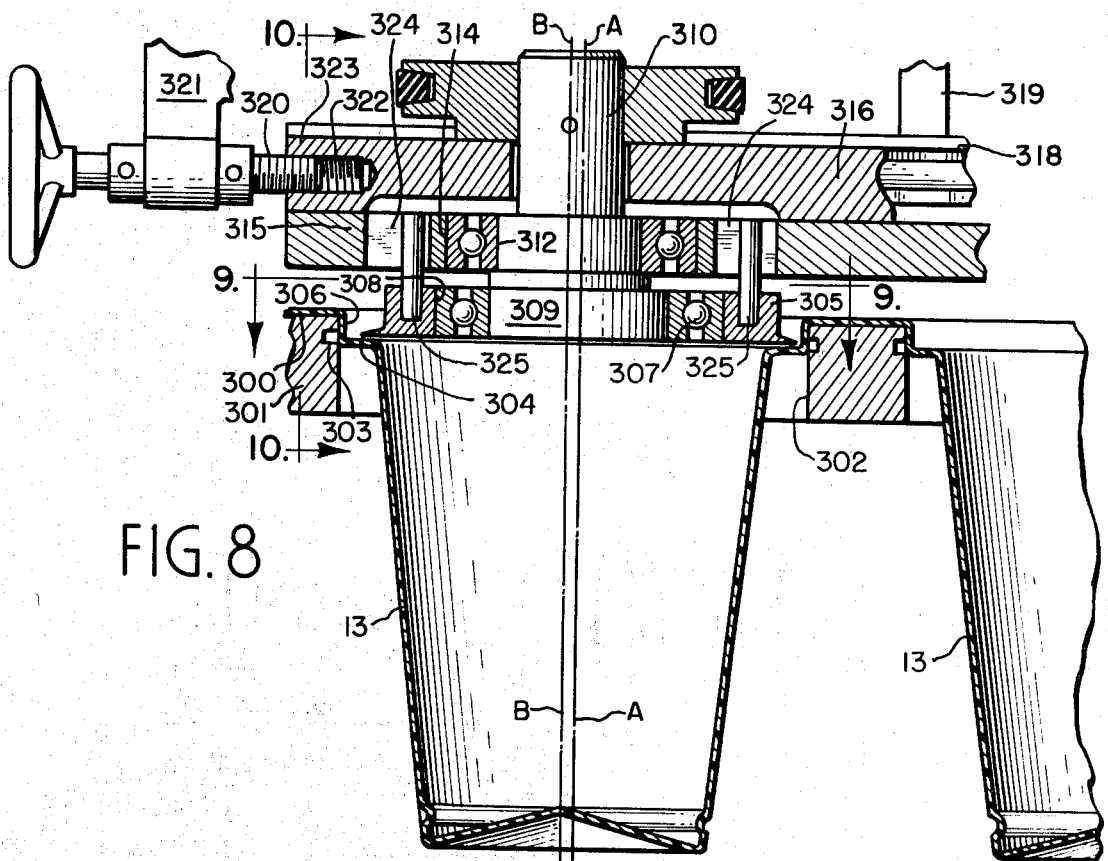
FIG. 8
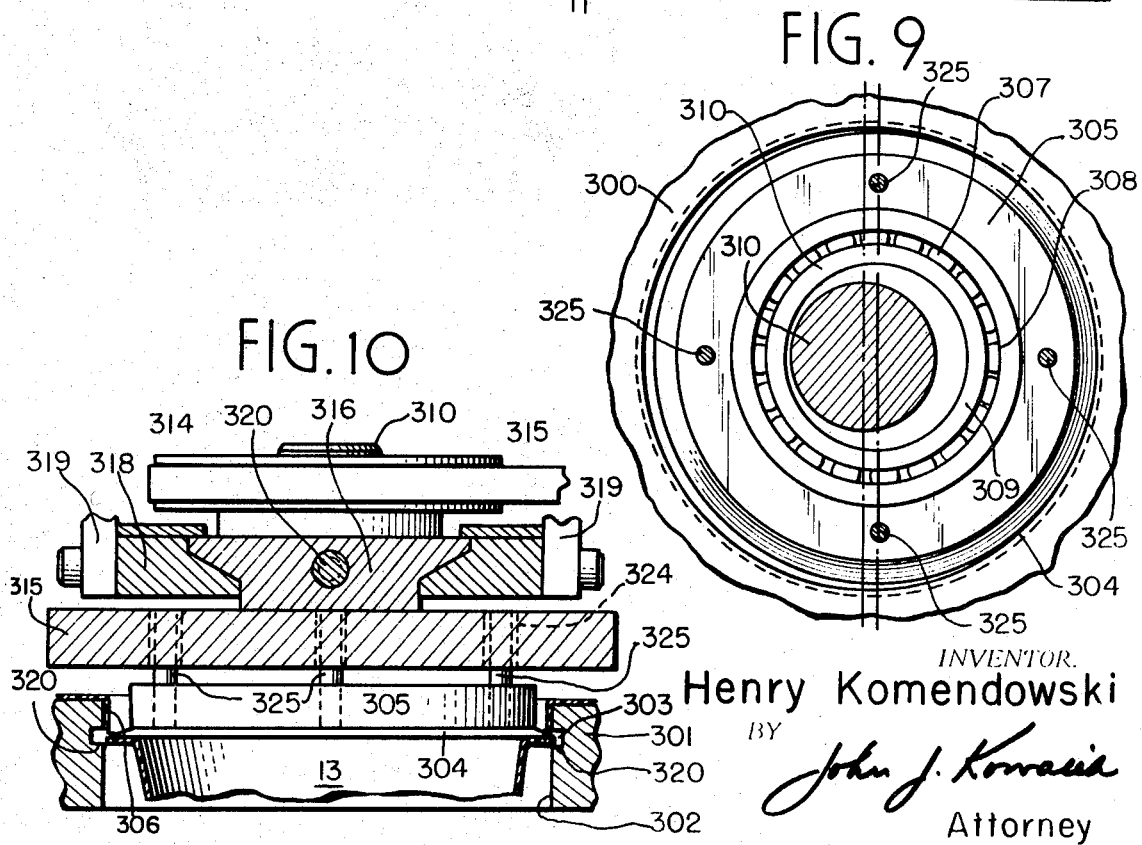
FIG. 9
FIG. 10
INVENTOR.
Henry Komendowski
BY
John J. Kowalik
Attorney

United States Patent Office

3,561,058
Patented Feb. 9, 1971

3,561,058
RIM SHAPING AND TRIMMING APPARATUS FOR PLASTIC CONTAINERS AND THE LIKE
Henry Komendowski, 2655 N. Motzart Ave., Chicago, Ill. 60647
Filed Apr. 4, 1968, Ser. No. 718,826
Int. Cl. B29c 17/00
U.S. Cl. 18—19   25 Claims

ABSTRACT OF THE DISCLOSURE

A knife assembly movable eccentrically about a plastic cup to trim the flash from the cup flange, the cup being guided into a bore of a nutating mold which has a progressive curl forming helical mold cavity about its interior engaging the flange, the cup being serially engaged by fingers which project into engagement with the cup to positively shift the cup through the bore by continuously wedging the flange into the encompassing cavity.

BACKGROUND OF THE INVENTION

(a) Field of the invention

This invention primarily, though not exclusively, is directed to novel means for trimming the lip-forming flange of a cup and further to novel means for forming the bead or curl by deforming such flange through a progressive mold or die cavity.

(b) Description of the prior art

Present lip forming apparatus has a very low performance rate and further the most acceptable designs utilize a plurality of heated rotating disks which tangentially engage the annular flange of the cup. The areas of engagement are merely line contacts and the mechanism requires that the cups rotate as the lip is being curled. Any momentary hesitation in the rotation of the cup causes the areas of tangential engagement of the flange with the disks to melt scorch and deform with the consequence that rotation of such cup and others following is frustrated and the mechanism thus becomes jammed. Most of the prior art machines have been proposed which require a prefolding of the terminal edges of the flanges on containers with an axially extending return section. This is usually done at the time that the cup is blown from a flat sheet into a mold cavity to form the cup, the return section developing from a raised axial rim about the cavity. This type of container forming frequently causes the material to stretch unevenly which makes the container of uneven section and can be cause for rejection if found to malfunction the vending machine dispensing mechanism or lid application machines. On the other hand the mold for making flanges normal to the container are simpler and in operation are most accurate. The instant invention will accept either the straight flange or the return section flange and with equal facility form a highly acceptable lip on containers of any shape whereas present structures could be used only on round containers.

SUMMARY OF THE INVENTION

The present invention comprehends an entirely new nutational principle of operation wherein the cup is stationary and the knife moves about an eccentric to trim the flange and to form the lip the mold nutates about an axis eccentric to the axis of the cup which is stationary and is serially engaged by stationary fingers from the inlet end of the mold bore to its outlet while the cup flange, which may either be preformed with an axially extending return section or extend normal to the axis of the cup, travels progressively along a heated helical curling groove merely by wedging the flange into the groove in progressive circumferential increments.

A primary object of the invention is to provide a novel apparatus for forming the lip about a cup which is stationary.

Another object is to devise a mechanism which in combination with a knife trims the flash or base material and in combination with a progressive die forms a lip about the edge of the cup.

A more specific object is to provide a novel mechanism for forming the lip about a cup, said mechanism comprising a die element having an axial bore for axially receiving a cup with an outwardly extending unformed flange thereabout, the periphery of the bore defined by a helical groove which progressively narrows into the final form of the curl, the cup being held against transaxial movement but being moved axially by a series of relatively stationary fingers arranged in a helix and projecting into the bore through apertures in the side of the mold, the mold in nutating causing the flange to progress along the groove while forming the curl in the lip.

A further object of the invention is to provide a lip curling mechanism which can form the lips on cups rapidly at a greatly improved rate over prior devices and which is substantially jam proof and does not depend upon uncontrollable factors such as uneven dimensioned stock or impositive movement of the formed article.

These and other objects and advantages inherent in and encompassed by the invention will become more readily apparent from the specifications and the drawings, wherein:

FIG. 1 is a vertical cross-sectional view of one form of the novel lip curling device;

FIG. 2 is a transverse sectional view taken substantially on line 2—2 of FIG. 1;

FIG. 5 is another embodiment of the invention in cross section similar to FIG. 1 in association with containers having their lip forming flanges preformed as return axial sections;

FIG. 6 is a cross-sectional view of an enlarged scale taken substantially on line 7—7 of FIG. 6;

FIG. 7 is an axial section on a scale reduced from FIG. 6 taken essentially on line 7—7 of FIG. 6;

FIGS. 8, 9 and 10 illustrate the invention applied to a cutter for trimming off the blank from which the cup and lip flange are formed;

FIG. 8 being an axial sectional view;

FIG. 9 being a transverse sectional view taken essentially on line 9—9 of FIG. 8; and FIG. 10 being an axial sectional view taken substantially on line 10—10 of FIG. 9.

EMBODIMENT OF FIGS. 1–4

Figure 3:
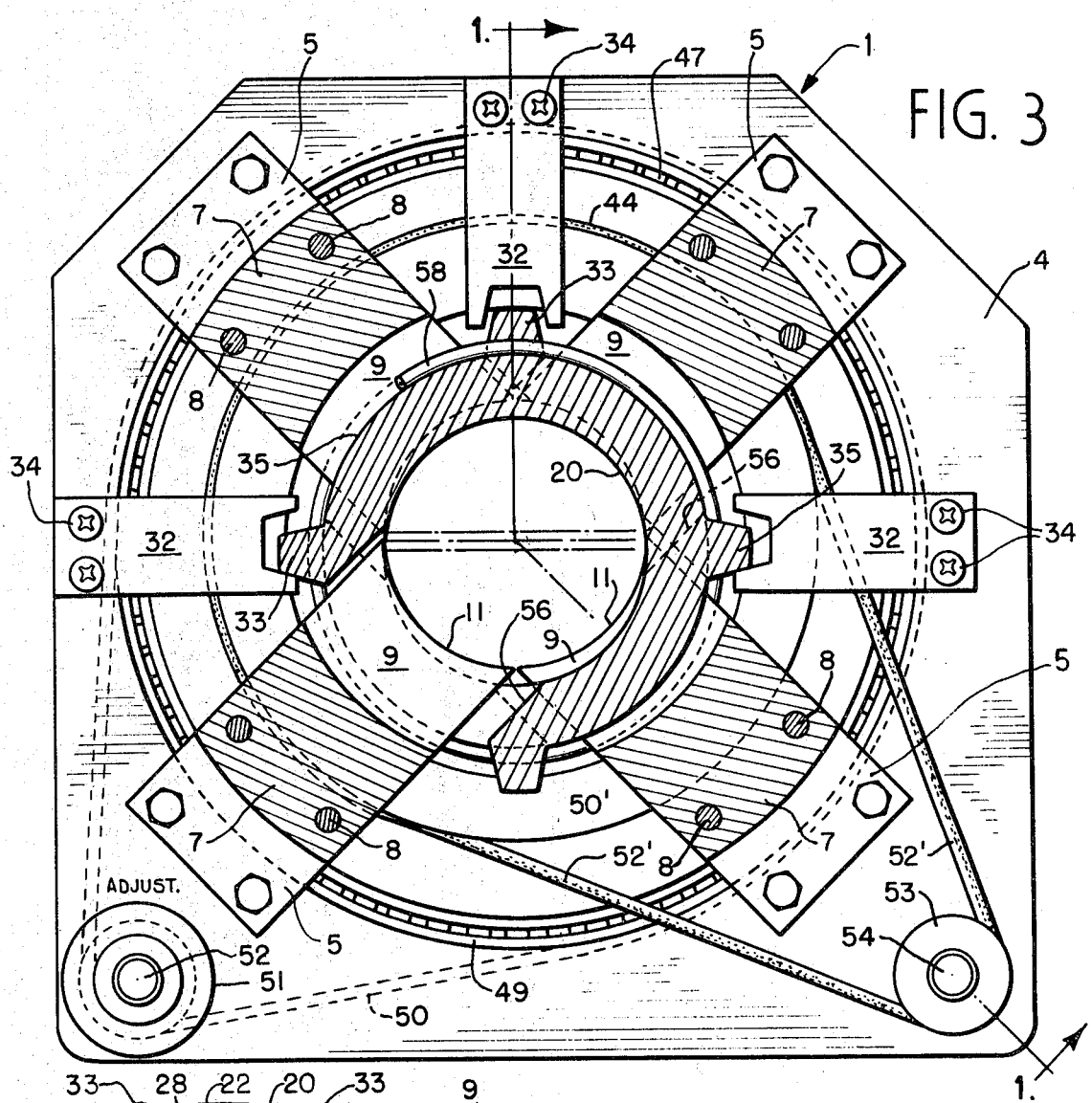
FIG. 3 is an enlarged transverse sectional view taken substantially on line 3—3 of FIG. 1.

Referring to the drawings and having particular reference to FIGS. 1–4, there is shown a lip forming mechanism 1 which comprises a stationary support generally designated 2 to which is bolted as by bolts 3, 3 a mounting element 4 which in turn supports a plurality of fingers or abutment, shifter or compresser assemblies 5, 5, herein shown in FIG. 3 as four in number arranged circumferentially 90° apart but may be of any number.

Figure 4:
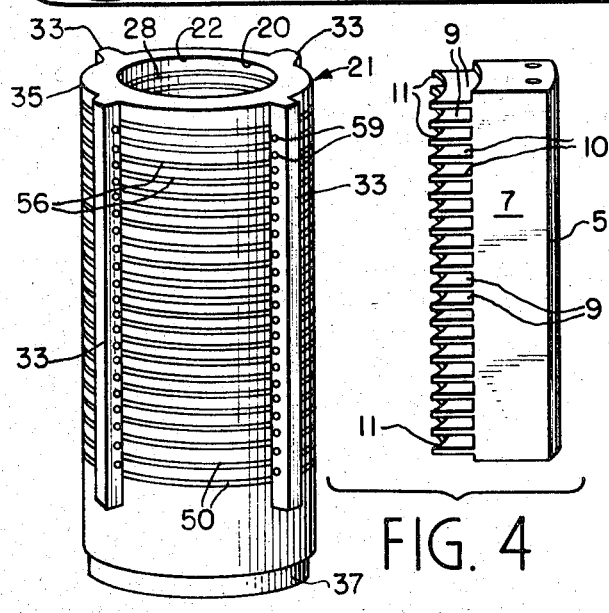
FIG. 4 is an exploded perspective view of the mold element and one of the container shifting fingers assemblies shown on a reduced scale.
Figure 6:
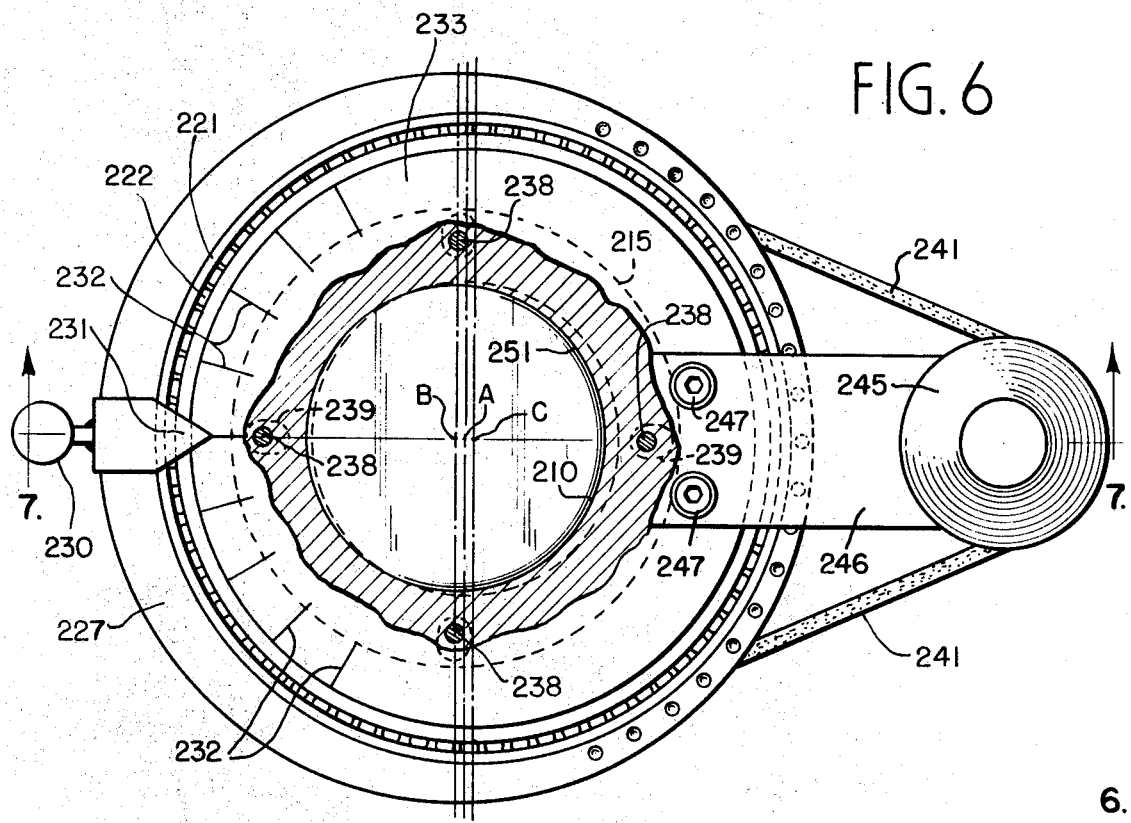
FIGS. 6 and 7 illustrate an embodiment of the invention to crimp the side wall of a cap into an annular recess at the top of the neck of a bottle or container.
Figure 7:
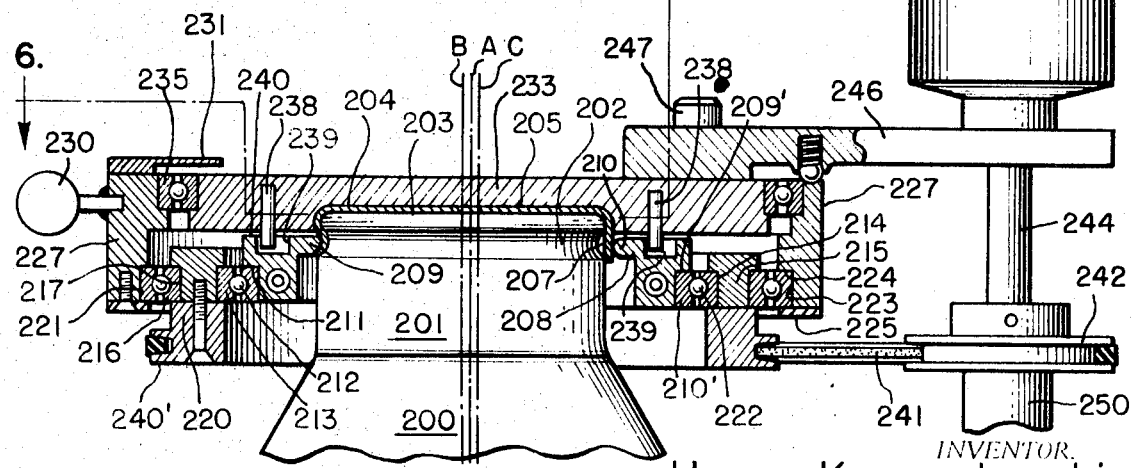

Each finger assembly as best seen in FIG. 4 includes a mounting block 7 elongated axially of the mechanism and each secured to the annulus by its respective nut and bolt assembly 8. These blocks 7 each are formed with a plurality of flat, pin or platelike fingers 9 which are vertically or axially aligned and lie in successive helical planes of predetermined pitch. Each finger has its inner end 10 integrally formed with the respective block 7 and has a free or distal end 11 formed with an arcuate inner edge of a radius commensurate with that of the side wall 12 of a cup or container 13 which it is intended to engage as best seen in FIG. 1.

For purposes of description the parts will be described as vertically oriented, as seen in FIG. 1, although it will be understood that the containers could be fed by appropriate mechanism, as will be well understood by those skilled in the art, into the inlet end 15 (FIG. 1) of the device which is defined by a series of guides 16 having flat plate like portions bolted to the top ends 17 of the posts or blocks 7 and the concave inner edge portions 18 of these plates are curved downwardly to form the inlet 15 in axial alignment with the bore 20 of a molding tool or die element 21. The upper or inlet end 22 of this bore 20 is dimensioned larger than the overall diameter of the unformed flat flange or rim 24 of the cups 13 which are fed in nested stacks 25 as best seen in outlines in the upper portion of FIG. 1 and in side elevation in full lines adjacent to the smooth-faced lower or exit end 26 of the bore 20.

The bore has an internal helical groove or forming cavity 28 which descends from the upper to the lower ends of the bore. As best seen in FIG. 1, the axial and radial depth of this groove progressively decreases from top to bottom and is somewhat semicircular in cross section having work performing top and bottom surfaces 29, 30 and an intervening concave bight surface 31.

The cage or forming element 21 is caused to nutate about its axis as will be hereinafter described and is constrained against rotation by a plurality of motion-accommodating anti-rotation loose-filling lost-motion interlocking cog or toothed counterparts 32, 33, the furcated element 32 being secured as by screws 34 to support element 4 and the individual lugs 33 being integral with and projecting from the external side 35 of the forming element 21.

The lower end portion 37 of the forming element 21 is externally cylindrical and has a shoulder 38 at its upper edge which rests upon the inner bearing race 39 complementally fitted onto portion 37, said outer race 40 of the roller bearing assembly 40' fitting into a bore 41 of an eccentric 42 which has a cylindrical outer profile 43 rotatably mounted in a roller bearing assembly 44 which is mounted in a bore 45 of an adjusting eccentric 46 which has a bearing mounting 47 in bore 48 in the support 2. The outer eccentric 46 has a pulley 49 connected thereto and a belt 50 is trained thereabout and about a frictionally locked pulley 51 which is mounted on a shaft 52 supported on the support 2. The pulley 52 is adapted to be manually rotated and locked to position the eccentric 46 which has a radius A (FIG. 2) whose center is offset from the centers of radii B and C of the bore 21 and eccentric 42 each of the radii B and C having their centers offset from each other.

The eccentric 42 has an integral driving pulley 50' which is driven by a belt 52' which in turn is driven by a pulley 53 connected to shaft 54 of a motor 55 which is mounted on the support 2 in any convenient manner.

Rotation of the eccentric 42 causes the forming element 21 to nutate and the fingers 9, each of which extends into the cavity 21 through complementary slots 56 in the element 20, to sequentially extend into the cavity 20 and withdraw therefrom. The position of the outer eccentric 46 and the eccentricity of both of the eccentrics will determine the extent of deviation from true center that the molding element 21 will move radially and thus is determinative of the extent of reciprocal projection of the fingers 9 through their respective slots 56 which are spiraled about the element 21. The slots are formed in the thread like portion 57 between the helices of the groove.

A heating coil 58 is spiraled about the external side 35 of the elements 21 through apertures 59 in the blocks 7. The coil carries a heated solution to maintain the forming element hot and thereby soften the thermoplastic material of the flange or rim of the container.

In operation a stack of containers with flat peripheral flanges or rims is inserted into the cavity 21. The lowermost container initially lays with the outer edge of its flange in the uppermost groove portion and partially on one of the uppermost fingers. No axial pressure is applied to the stack. Each cup feeds individually even in the stack. As the forming element 21 is caused to nutate it applies radial force or pressure to the flange at one side of such container which is partially axially curled as that portion of the element moves toward the container while the opposite side of the cup abuts against the opposing finger 9. This flange is continuously progressed down the groove through continuous progressive engagement of the groove with the rim and the groove incrementally becomes shallower and gradually conforms to the final shape of the curl. The bore 20 also becomes radially smaller until it is of slightly larger size than the finished curled lip and the bore below the forming portion is cooled by cooling 58' to set the curl and is thereat smooth and cylindrical at the outlet end 60 such that the containers are free to drop into a suitable receptacle.

DESCRIPTION OF FIG. 5

Figure 5:
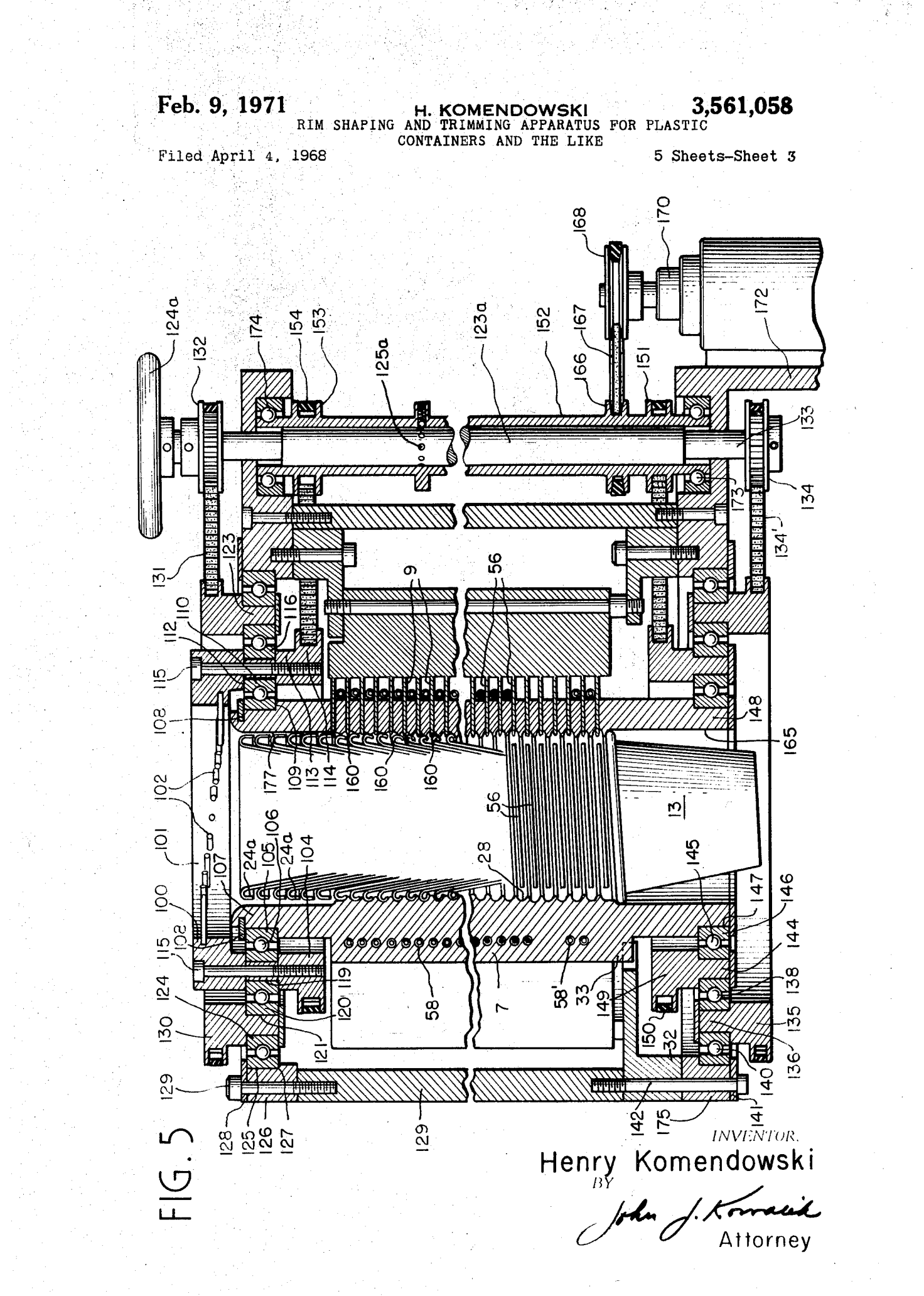

The structure of FIG. 5 is essentially the same as that shown in FIGS. 1–4 but is designed to accept containers 13 with the flanges or rims preformed as return sections as seen at 24a. In this embodiment an inlet annulus 100 is provided with a bore 101 into which project a series of resilient fingers 102 which are formed of nylon or other flexible poor heat conducting material. These fingers which serve as feed means are arranged in a helix so that as the cups drop they descend gently into the inlet bore 101.

The annulus 100 is connected to an eccentric 104 which rotates between roller bearing 105, 106. The inner race of bearing 105 is rotatively mounted about the upper end portion 107 of the element 21 in a recess therein and held by a snap ring 108 against a shoulder 109. The outer race 110 is mounted against a shoulder 109. The outer race 110 is mounted against the internal periphery of eccentric 104 and held at its top against vertical displacement by the bottom edge 112 of the ring 100 and at its bottom by the hub 113 of a drive pulley 114, the ring 100 and eccentric 104 are bolted together by bolts 115. The inner race 116 of a ball bearing assembly 106 is sleeved over the outer periphery 119 of eccentric 104 and held between the ring 100 and hub 113. The outer race 120 of bearing 106 is confined in a groove 121 in the inner periphery of an adjusting eccentric 123 which at its outer periphery is mounted in a bearing 124 which is secured within a groove 125 in a top carrier rim 126 between a shoulder 127 and a holder 128 bolted by bolts 129 to the top edge of a housing 129.

The eccentric 104 is provided with an upper toothed pulley 130 about which is trained a cog belt 131 which extends about a cog pulley 132 connected to a shaft 123a which is connected to a turning adjusting wheel 124a and by the adjusting ball and notch interlock 125a to shaft 152.

Shaft 123a extends downwardly and at its lower end 133 is connected to a cog pulley 134 about which is trained a complementary cog belt 134' which is trained about a pulley 135 which is connected to a lower adjusting eccentric 136 which is identical with eccentric 104 and is synchronized therewith. The eccentric 136 is mounted between roller bearing assemblies 138, 140, the outer bearing assembly 140 being supported in a lower mounting ring 141 connected as by bolts 142 through abutment stops 32 to the lower end of housing 129. An operating rotating eccentric 144 is rotatively mounted between the inner bearing assembly 138 and a bearing assembly 145, the latter having its inner race 146 recessed mounted as at 147 to the lower end portion 148 of molding element 21. These bearings are removable mounted to their respective elements by removable rings and the like similar to the top bearings, such mountings being common.

The eccentric 144 has a cog pulley 149 which mates with a cog belt 150 which wraps about a pulley 151, connected to the lower end of a quill 152, which is sleeved over shaft 123a which serves as a journal therefor.

Quill 152 has a cog pulley 153 at its upper end which drives a cog belt 154 which is wrapped about the cog pulley 114. Thus the upper and lower substantially identical eccentrics are timed to rotate in synchronism to nutate or oscillate the forming tool element 21 which is held against rotation by the furcations of each abutment element 32 loosely flanking the lug 33 on the body portion 21 of the forming element as in the previous embodiment.

The finger assemblies 7 are the same as in the previous embodiment and project through accommodating slots 56 into the bore 20 of element 21 and engage the side walls of the respective cups.

The slots 56 in this embodiment as in the previous are dimensioned to accommodate nutation or oscillation of the forming element without obstruction.

In this embodiment the bore 20 is cylindrical at its upper end to fit the preformed upper ends of the cups therein and the groove 28 with its work performing surface is slightly altered over that of the previous embodiment in that the groove is axially elongated at the inlet 22 in the previous embodiment so as to admit the axially turned section 24a of the flange or rim as best seen in FIG. 5. Furthermore, in the present embodiment the fingers 9 and the slots 56 are located within the groove and the arcuate inner ends of the fingers bear against the curing flange as at 160 while at the side opposite to the extended fingers the flange is forced radially into the related portion of the helix which is maintained hot by the heating coils 58. The container as in the previous embodiment will continue to tilt laterally at 90° intervals or more specifically nutate and keep dropping to the widened outlet end 165 of the bore 21. No axial load is exerted through the stack and the cups all nutate together and are accommodated axial movement individually to form the rims.

Rotation of the top and bottom eccentrics 104, 144 is effected by the drive train comprising a pulley 166 on quill 152 and a belt 167 trained about pulley 166 and a pulley 168 of the output shaft of an electric motor 170 which is carried by a support 172 which also supports the housing and parts connected thereto such as the bearing journals 173, 174 for the quill 152 as well as the top and bottom mounting elements 126, 175 for the eccentrics.

In operation, a stack of cups or containers or tubes which are to be provided with curled lips are introduced from the top with the preformed flange or rim section of the lowermost cup seated on the fingers 102. Rotation of annulus 100 causes the cups to spiral down into the widened upper inlet portion 177 of bore 20 of forming element 21 which is nutating due to the rotation of the eccentrics 104, 144. If more or less eccentricity is required the handle 124a is turned in the appropriate direction to reposition the adjusting eccentrics 123, 136 to increase or decrease the extent of the radius identified at B in the previous embodiment. The cups progress downwardly in bore 20 as heretofore described by the fingers at one side holding the cups from laterally moving while the forming element advances against the diametrically opposite side of the flange causing it to curl to the profile of the segment of the groove at that instant in radial alignment with the particular cup flange. The cups in this and the previous embodiment keep nutating down the spiral while the curl is being formed until the cup reaches the lower portion of the bore and drops into an appropriate receiver. Coil 58' cools the cups as they reach the outlet 165. Shafts 152, 123a rotate together. The pulleys 130, 135 or 132, 134 may be of any desired size to effect whatever motion is required.

EMBODIMENT OF FIGS. 6 AND 7

This embodiment illustrates the application of the principles of the invention to a bottle capping operation in which a bottle 200 has a neck 201 with a peripheral groove 202 adjacent to its upper edge 203. A cap 204 of plastic or other deformable material has a top web 205 placed over the upper edge 203 of the container 200, the cap having an annular peripheral wall 207 encompassing the upper neck portion of the container and projecting below the groove 202. An annular forming tool 208 is sleeved over the wall 207 and has an apertured disklike portion 209 with an inner radially inwardly tapering edge or work performing surface portion 210' in alignment with groove 202. The forming tool 208 is peripherally recessed at its lower end as at 209' and admits an inner race 210' thereon against an overhanging shoulder 211. Bearing balls 212 surround race 210 and are trapped between it and the outer race 213 which fits into a notch 214 in the inner periphery of the operating eccentric 215 which is T-shaped in cross-section, the ends of the T overlapping the outer race 213 and the outer bearing assembly inner race 216 which is sleeved over the outer periphery 217 of the eccentric 215. The bottom sides of races 213, 216 are seated on the top of a pulley hub 220 bolted to eccentric 215. The outer race 221 is separated from race 216 by the balls 222. Race 221 is fitted in a bore 223 in an outer adjusting eccentric 227 and held in place by shoulder 224 and clamping ring 225 bolted to eccentric 227. Eccentric 227 is adjustable about its axis C (as seen in FIG. 1) by handle 230 connected thereto, the adjustment being indicated by a pointer 231 on the eccentric or cam 227 against the incremental angularity indicia 232 on the stationary reaction plate 233 about which the eccentric 227 is rotatable via bearing assembly 235 nested and suitably secured between plate 233 and cam 227.

Plate 233 carries abutment pins 238 depending therefrom into notches 239 in the upper side 240 of the tool, notches 239 being dimensioned to accommodate maximum motion of nutation of the tool consistent with the design of the nutation inducing cam or eccentric and that of the adjusting eccentric.

The operating eccentric 215 is driven by a pulley 240¹, which is part of hub 220, from a belt 241 trained about a pulley 242 which is connected to a shaft 244 of an electric motor 245 carried on an arm 246 which is connected as by bolts 247 to the reaction plate 233.

This entire assembly may be carried by any suitable support which is herein shown as a stand 250 to which shaft 244 is journaled.

It will be observed that only for purposes of illustration the unformed cap is inserted into the forming tools aperture upon the upper end of the bottle. The motor is turned on and the eccentric causes the tool to nutate and crimp the side wall of the cap into the groove. Since the opening 251 in the tool is slightly larger than the overall diameter of the cap, the bottle with the cap crimped thereon is readily removed.

DESCRIPTION OF FIGS. 8–10

The principles of the instant invention are herein shown as applied to a cut-off tool for trimming the flash or cutting off the blank from the cup flange. In this embodiment the cups or containers 13 are shown preparatory to being cut out from the blank 300 which lays on the support plate 301 having a series of cup-admitting apertures 302, the edges of which are provided with sharp edged grooves 303 into which the work performing edge 304 of the eccentrically driven annular knife or tool 305 is caused to penetrate while shearing the annular connecting portion 306 of the blank 300. The knife 305 is in the form of a ring having an inner cylindrical bore 308 into which is pressed a roller bearing assembly 307 also pressed over the eccentric 309 on the lower end of drive shaft 310 which is journaled intermediate its ends in a roller bearing assembly 312, bearing 312 being tightly fitted into a complementary bore 314 in a reaction and setting block 315 which is connected to a guide block 316 (FIG. 1) having a slidable dovetail connection with the supporting guide structure 318 which may be carried from suspended supports 319. The block 316 and structures connected thereto are movable transversely of the axis of the shaft 310 by an adjusting bolt 320 journaled in a stationary support 321 and threaded at 322 into a frame 323 carrying block 316 and thus bringing the knife edge into shearing cooperation with the groove edges 320. The knife is held against rotation by pins 325 fastened thereon and projecting upwardly into slots 324 in plate 315 which forms part of the block 316. Thus the eccentric within the knife rotates causing the knife to nutate to penetrate the surrounding groove 303.

In each of these embodiments the principle of nutating the tool is used to process as by cutting or forming an article by causing the tool to progressively move in a direction transverse to the article being acted upon. The tools do not rotate, thus no overheating problem develops. The material being acted upon is treated gently. The mechanism is simple and yet highly effective.

Having described various embodiments of the invention, it will be apparent that other embodiments will become apparent without departing from the scope of the appended claims.

What is claimed is:

1. Apparatus for forming rolled lips on plastic containers or the like having rim flanges comprising: body means having a container-admitting passage, lip-forming helical groove means in the passage in said body means adapted to work the flange of a container positioned within the passage, finger means projecting into the passage for holding the container in position for working engagement of the flange thereof by the lip-forming groove means, and means for relatively nutating the body means about the container to thereby progressively circumferentially engage the rim flange of the container by the lip-forming groove means.

2. The invention according to claim 1 and said lip-forming helical groove means extending from adjacent to one end of said passage to adjacent the other end thereof.

3. The invention according to claim 2 and said finger means reciprocal through slots in the body for sequentially grasping and releasing the containers in the passage.

4. The invention according to claim 2 and said finger means comprising oppositely disposed fingers extending into the passage through openings in the body means, and said means for nutating said body means causing said fingers to reciprocate into and out of the passage.

5. The invention according to claim 1 and said finger means comprising stationary fingers arranged with said lip-forming groove means in a helical pattern about the axis of said passage.

6. The invention according to claim 1 and said finger means arranged in a stepped pattern from one end of the passage to the other.

7. The invention according to claim 1 and said lip-forming groove means being open to the passage and narrowing from one end of the passage to the other.

8. The invention according to claim 7 and said body means having transverse slots extending between the helices of the groove means, and said finger means projecting through the slots.

9. The invention according to claim 1 and a stationary support for said body means, and lost-motion means interlocking the support and body means against rotation while accommodating nutation thereof.

10. The invention according to claim 1 and a support for said body means, means interlocking the support with the body means constraining said body means against rotation while accommodating nutation thereof, and said nutating means comprising driven eccentric means mounting the body means from the support.

11. The invention according to claim 10 and means for adjusting the eccentricity of the said eccentric means for adjusting the position thereof relative to a predetermined axis of movement of the containers through said passage.

12. The invention according to claim 11 and said eccentric means spaced along said body means, and means for driving at least one of said eccentric means.

13. The invention according to claim 1 and said lip-forming helical groove means being of generally arcuate cross-section extending from adjacent to the inlet end of the passage to adjacent to the outlet end of the passage and having a progressively diminishing axial and radial depth from said inlet to said outlet of the passage.

14. Apparatus for forming rolled lips on containers having deformable rims, body means having an elongated passage for admitting nested containers therethrough, lip-forming helical groove means supported on said body means within the passage for deforming the rim, finger means for guiding the containers through the passage in a predetermined path, and means for eccentrically moving said body means and lip-forming means about said containers for progressively engaging said lip-forming means with the rims of respective containers moving through the passage for curling the rims.

15. The invention according to claim 14 wherein the containers are of thermoplastic material, and means for heating said apparatus at one end of the passage, and means for cooling the apparatus at the outlet end of the passage for respectively softening the unformed rims of the containers upon entry into the passage and setting the formed rims at the outlet.

16. The invention according to claim 15 and said finger means projecting into the passage from opposed sides thereof between the lip-forming means.

17. The invention according to claim 16 and said finger means arranged in a spiral pattern about said passage and reciprocally entering and withdrawing with respect to the passage in underposed relation to the rims of respective containers.

18. The invention according to claim 17 and said finger means being relatively stationary, and support means for the body means, and a connection between the support means and the body means restraining the body means from rotational movement and accommodating said eccentric movement.

19. Apparatus for forming heated flanges of plastic containers by curling the flanges under, comprising: a body having a passage therethrough, said containers adapted to be entered into one end of said passage with unformed flanges and discharged from the other end of the passage with curled flanges, spiral groove means on the surface of the passage providing arcuate progressive shaped forming segments for engaging the heated flange of each container and incrementally curling the same, and progressing the container through the passage, finger means extending into the passage and progressively engaging the containers for holding the containers against lateral movement from a predetermined path in said passage, and assisting in moving the containers axially through said passage, and means for shifting said body in an eccentric orbit about said containers for opposedly advancing and retracting said fingers, and said fingers holding the containers momentarily for engagement of the opposed forming segments with the flanges of the respective containers.

20. The invention according to claim 19 and said passage progressively tapering from the inlet toward the outlet and means for heating the segments at the inlet and cooling the segments at the outlet.

21. The combination of a stationary member having an annular recess adapted to accommodate a deformable bottle cap having a peripheral flange, an annular forming tool with an internal die surface in axial alignment with the recess, said cap adapted to receive an open neck portion of a container having a peripheral closure profile therein in transverse alignment with the peripheral flange of the cap and said die surface, and means for relatively nutating the forming tool relative to the recess about the neck portion of the container for deforming the flange about said profile thereby sealing the cap about said portion.

22. The invention according to claim 21 and said nutating means comprising an eccentric means between said stationary member and tool, and means for orbiting said tool about said eccentric means.

23. The invention according to claim 22 and means for varying the eccentricity of said eccentric means relative to the central axis of the cap.

24. The invention according to claim 21 and said stationary member comprising bearing means encompassing the cavity, a rotatable driven element about the tool, and eccentrically arranged bearing means between the tool and rotatable driven element and between the element and the bearing means.

25. The invention according to claim 22 and means interlocking said stationary member against relative rotation and accommodating relative nutation therebetween.

References Cited

UNITED STATES PATENTS

| | | | |
|---|---|---|---|
| 3,096,546 | 7/1963 | Edwards | 18—19BCX |
| 3,192,565 | 7/1965 | Rukavina | 18—19BC |
| 3,239,887 | 3/1966 | Weber | 18—19BC |
| 3,337,919 | 8/1967 | Brown | 18—19BC |
| 3,339,005 | 8/1967 | Brown et al. | 18—19BCX |
| 3,454,987 | 7/1969 | Edwards | 18—19BC |

J. SPENCER OVERHOLSER, Primary Examiner